(12) United States Patent  
Fisher (10) Patent No.: US 12,545,045 B2  
(45) Date of Patent: Feb. 10, 2026

(54) DIRECT THERMAL RECORDING MEDIA WITH DIARYLUREA COMBINATIONS FOR OIL RESISTANCE

(71) Applicant: Appvion, LLC, Appleton, WI (US)

(72) Inventor: Mark R. Fisher, Appleton, WI (US)

(73) Assignee: Appvion, LLC, Appleton, WI (US)

( * ) Notice: Subject to any disclaimer, the term of this patent is extended or adjusted under 35 U.S.C. 154(b) by 0 days.

(21) Appl. No.: 18/230,368

(22) Filed: Aug. 4, 2023

(65) Prior Publication Data

US 2024/0059090 A1 Feb. 22, 2024

Related U.S. Application Data

(60) Provisional application No. 63/396,893, filed on Aug. 10, 2022.

(51) Int. Cl.
*B41M 5/333* (2006.01)
*B41M 5/42* (2006.01)
*B41M 5/327* (2006.01)

(52) U.S. Cl.
CPC ............ *B41M 5/3333* (2013.01); *B41M 5/42* (2013.01); *B41M 5/3275* (2013.01); *B41M 2205/04* (2013.01)

(58) Field of Classification Search
CPC .. B41M 5/323; B41M 5/3275; B41M 5/3333; B41M 5/42; B41M 2205/04
See application file for complete search history.

(56) References Cited

U.S. PATENT DOCUMENTS

| | | | |
|---|---|---|---|
| 3,539,375 A | 11/1970 | Baum | |
| 3,674,535 A | 7/1972 | Blose et al. | |
| 3,746,675 A | 7/1973 | Blose et al. | |
| 4,094,687 A | 6/1978 | Lawton | |
| 4,097,288 A | 6/1978 | Lawton | |
| 4,151,748 A | 5/1979 | Baum | |
| 4,169,705 A | 10/1979 | Boyd et al. | |
| 4,181,771 A | 1/1980 | Hanson et al. | |
| 4,246,318 A | 1/1981 | Baum | |
| 4,470,057 A | 9/1984 | Glanz | |

(Continued)

FOREIGN PATENT DOCUMENTS

| DE | 102004004204 A1 | 11/2005 |
|---|---|---|
| EP | 1024409 A2 | 8/2000 |

(Continued)

OTHER PUBLICATIONS

Machine translation of detailed description of JP 2019-130879 acquired on Jan. 11, 2025.*

(Continued)

*Primary Examiner* — Gerard Higgins (74) *Attorney, Agent, or Firm* — Amundsen Davis, LLC (57) ABSTRACT

Non-phenolic direct thermal recording media have a thermally responsive layer containing a leuco dye and a plurality of diarylurea acidic developers selected to improve the quality and readability of the image produced in such media, particularly after being contacted with oils such as vegetable oil. The diarylurea developers preferably include, or consist essentially of, or consist of, N,N'-diphenylurea ("DPU") and a derivative of DPU. An exemplary combination is DPU together with a developer known commercially as TGMD.

9 Claims, 6 Drawing Sheets

(56) References Cited

U.S. PATENT DOCUMENTS

| | | |
|---|---|---|
| 4,531,140 A | 7/1985 | Suzuki et al. |
| 4,794,102 A | 12/1988 | Petersen et al. |
| 5,098,882 A | 3/1992 | Teraji et al. |
| 5,215,812 A | 6/1993 | Kano et al. |
| 5,342,649 A | 8/1994 | Sarokin |
| 5,773,186 A | 6/1998 | Takashima |
| 5,955,398 A | 9/1999 | Fisher et al. |
| 6,015,771 A | 1/2000 | Fisher et al. |
| 6,429,341 B2 | 8/2002 | Mathiaparanam |
| 6,777,075 B2 | 8/2004 | Concannon et al. |
| 6,835,691 B2 | 12/2004 | Mathiaparanam et al. |
| 6,921,740 B1 | 7/2005 | Hizatate et al. |
| 6,995,784 B2 | 2/2006 | Kalishek |
| 7,125,824 B2 | 10/2006 | Mathiaparanam et al. |
| 7,235,308 B2 | 6/2007 | Druckrey et al. |
| 7,262,150 B2 | 8/2007 | Kalishek et al. |
| 7,361,399 B2 | 4/2008 | Song et al. |
| 7,476,448 B2 | 1/2009 | Natsui et al. |
| 7,485,402 B2 | 2/2009 | Arai et al. |
| 7,635,662 B2 | 12/2009 | Kabashima et al. |
| 7,749,580 B2 | 7/2010 | Song et al. |
| 7,807,738 B2 | 10/2010 | Kabashima et al. |
| 8,287,961 B2 | 10/2012 | Hill et al. |
| 8,334,047 B2 | 12/2012 | Kelly et al. |
| 8,460,774 B2 | 6/2013 | Bethe |
| 8,480,225 B2 | 7/2013 | Romano, Jr. et al. |
| 8,536,087 B2 | 9/2013 | Harrison et al. |
| 8,563,468 B2 | 10/2013 | Kodama et al. |
| 8,709,546 B2 | 4/2014 | Zhou et al. |
| 8,795,796 B2 | 8/2014 | Koenig |
| 8,802,591 B2 | 8/2014 | Hill et al. |
| 8,877,678 B2 | 11/2014 | Koyama et al. |
| 8,916,496 B2 | 12/2014 | Chakar et al. |
| 8,916,497 B2 | 12/2014 | Fisher et al. |
| 9,034,790 B2 | 5/2015 | Chakar et al. |
| 9,199,503 B1 | 12/2015 | Fisher et al. |
| 9,418,576 B2 | 8/2016 | Franklin |
| 9,534,156 B2 | 1/2017 | Fisher |
| 9,656,498 B2 | 5/2017 | Yamane et al. |
| 9,767,714 B2 | 9/2017 | Franklin |
| 9,789,721 B2 | 10/2017 | Takano et al. |
| 9,962,980 B2 | 5/2018 | Morie et al. |
| 10,160,245 B2 | 12/2018 | Horn |
| 10,184,062 B2 | 1/2019 | Einsla et al. |
| 10,265,985 B2 | 4/2019 | Horn |
| 10,933,681 B2 | 3/2021 | Chakar et al. |
| 11,292,280 B2 | 4/2022 | Fisher et al. |
| 11,370,241 B2 | 6/2022 | Fisher et al. |
| 11,376,879 B2 | 7/2022 | Fisher |
| 11,529,819 B2 | 12/2022 | Sakai et al. |
| 11,718,103 B2 | 8/2023 | Fisher et al. |
| 12,151,498 B2 * | 11/2024 | Fisher .................. B41M 5/323 |
| 2001/0044553 A1 | 11/2001 | Kabashima et al. |
| 2004/0096598 A1 | 5/2004 | Kasamatsu et al. |
| 2004/0096599 A1 | 5/2004 | Kobayashi et al. |
| 2004/0191433 A1 | 9/2004 | Sakaguchi et al. |
| 2005/0096221 A1 | 5/2005 | Fisher et al. |
| 2007/0042907 A1 | 2/2007 | Nagasawa et al. |
| 2009/0086032 A1 | 4/2009 | Li |
| 2009/0155613 A1 | 6/2009 | Kalishek |
| 2009/0286032 A1 | 11/2009 | Franklin |
| 2011/0104619 A1 | 5/2011 | Fujii et al. |
| 2011/0285122 A1 | 11/2011 | Hill et al. |
| 2016/0031254 A1 | 2/2016 | Neukirch et al. |
| 2017/0365195 A1 | 12/2017 | Franklin |
| 2019/0193447 A1 | 6/2019 | Fisher et al. |
| 2019/0270328 A1 | 9/2019 | Kishimoto et al. |
| 2019/0291493 A1 | 9/2019 | Fisher et al. |
| 2020/0086669 A1 * | 3/2020 | Sakai .................. C07C 275/42 |
| 2021/0155027 A1 | 5/2021 | Fisher |
| 2021/0340099 A1 | 11/2021 | Kinishi et al. |
| 2022/0184985 A1 | 6/2022 | Fisher |
| 2022/0184986 A1 | 6/2022 | Fisher |
| 2022/0332135 A1 | 10/2022 | Fisher |
| 2023/0279615 A1 | 9/2023 | Fisher et al. |
| 2024/0308260 A1 | 9/2024 | Kenji et al. |

FOREIGN PATENT DOCUMENTS

| | | |
|---|---|---|
| EP | 1681174 A1 | 7/2006 |
| EP | 1565614 B1 | 7/2007 |
| EP | 2033799 A1 | 3/2009 |
| EP | 2033800 A1 | 3/2009 |
| EP | 1116713 A1 | 2/2010 |
| EP | 3103649 A1 | 12/2016 |
| EP | 3395583 A1 | 10/2018 |
| EP | 3636446 A1 | 4/2020 |
| EP | 3677569 A1 | 7/2020 |
| EP | 4420887 A1 | 8/2024 |
| JP | H082112 A | 1/1996 |
| JP | 2578069 B2 | 2/1997 |
| JP | 2002187364 A | 7/2002 |
| JP | 2002283744 A | 10/2002 |
| JP | 2004223871 A | 8/2004 |
| JP | 2004255842 A | 9/2004 |
| JP | 2004314623 A | 11/2004 |
| JP | 2005330291 A | 12/2005 |
| JP | 2006104219 A | 4/2006 |
| JP | 2006143740 A | 6/2006 |
| JP | 2006143741 A | 6/2006 |
| JP | 2006299498 A | 11/2006 |
| JP | 2008194986 A | 8/2008 |
| JP | 4721432 B2 | 7/2011 |
| JP | 2012061612 A | 3/2012 |
| JP | 2013237234 A | 11/2013 |
| JP | 2016068418 A | 5/2016 |
| JP | 2016165835 A | 9/2016 |
| JP | 2016182799 A | 10/2016 |
| JP | 2017081107 A | 5/2017 |
| JP | 2018065338 A | 4/2018 |
| JP | 2019077101 A | 5/2019 |
| JP | 2019084758 A | 6/2019 |
| JP | 2019130879 A | 8/2019 |
| JP | 6586915 B2 | 10/2019 |
| JP | 2019534190 A | 11/2019 |
| JP | 2017177346 A | 2/2020 |
| JP | 2020082406 A | 6/2020 |
| KR | 20170073100 A | 6/2019 |
| KR | 20200004838 A | 1/2020 |
| WO | 2000014058 A1 | 3/2000 |
| WO | 2015181291 A1 | 12/2015 |
| WO | 2016150428 A1 | 9/2016 |
| WO | 2018015178 A1 | 1/2018 |
| WO | 2018139183 A1 | 8/2018 |
| WO | 2018215287 A1 | 11/2018 |
| WO | 2018225663 A1 | 12/2018 |
| WO | 2019044462 A1 | 3/2019 |
| WO | 2019049619 A1 | 3/2019 |
| WO | 2019130968 A1 | 7/2019 |
| WO | 2020039601 A1 | 2/2020 |
| WO | 2023100900 A1 | 6/2023 |
| WO | 2023100902 A1 | 6/2023 |
| WO | 2024048337 A1 | 3/2024 |
| WO | 2025018318 A1 | 1/2025 |

OTHER PUBLICATIONS

Machine translation of detailed description of JP 2016-068418 acquired on Jan. 10, 2025.*
PCT "International Search Report" and "Written Opinion" for PCT/US2023/029518 of Nov. 23, 2023, 12 pages.
Office Action for Japanese Patent Application No. 2023-534746 issued on May 24, 2024, 5 pages filed herewith.
Written Opinion of the IPEA for PCT/US2023/029518 dated Jun. 27, 2024, 6 pages filed herewith.
Aquasol™ Water Soluble Paper and Tape brochure, 2019 or earlier, 4 pages.
Avery Dennison™ FreshMarx™ flyer, 2018, 1 page.
FreshMarx™ flyer, "Trust Your Food Safety", 2010, 1 page.
Neenah™ Dispersa™ for Labels 7630P0 brochure, Oct. 2020, 1 page.

(56) References Cited

OTHER PUBLICATIONS

Neenah™ Dispersa™ for Tag and Boardstock brochure, Jul. 2020, 1 page.
PCT Written Opinion for PCT/US2020/064342, dated Aug. 12, 2021, 6 pages.
PCT Written Opinion for PCT/US2021/062598, dated Apr. 7, 2022, 8 pages.
Smartsolve™ Product Data Sheet, Jul. 21, 2015, 2 pages.
Björnsdotter et al., "Bisphenol A and replacements in thermal paper: A review", Chemosphere, vol. 182, Sep. 2017, pp. 691-706.
Eckardt et al., "Bisphenol A and alternatives in thermal paper receipts—a German market analysis from 2015 to 2017", Chemosphere, vol. 186, Nov. 2017, pp. 1016-1-25.
Eckardt et al., "Determination of color developers replacing bisphenol A in thermal paper receipts using diode array and Corona charged aerosol detection—A German market analysis 2018/2019", Journal of Chromatography A, vol. 1609, Jan. 4, 2020.
Kilyk, John, Third Party Submission Under 37 CFR 1.290 filed on Oct. 15, 2025 in U.S. Appl. No. 18/826,847, 8 pages filed herewith.
EPO Communication with Notice of Opposition, filed on Mar. 17, 2025 for EP Patent Application No./Patent No. 20838767.0—1014 / 4259449, 53 pages filed herewith.
Opposition against a European patent, filed Mar. 17, 2025 for EP Patent Application No./Patent No. 20838767.0—1014 / 4259449, 52 pages filed herewith.
PCT International Search Report and Written Opinion for PCT/US2025/022742 dated Oct. 27, 2025, 10 pages.
Decision of Rejection for JP Patent Application No. 2023-534746 dated Sep. 25, 2025, 4 pages.

* cited by examiner

| Sample | D-8 | TGSH | Tolbut. | NKK-1304 | TGMD | S-176 | DPU | Initial ANSI | Initial OD | oil, room temp ANSI | oil, room temp % loss | oil, 40 C ANSI | oil, 40 C % loss | oil, 60 C ANSI | oil, 60 C % loss |
|---|---|---|---|---|---|---|---|---|---|---|---|---|---|---|---|
| CE 1 | | | | | | | ✓ | A | 1.68 | F | 90 | F | 92 | F | 92 |
| CE 2 | | | | | | | | A | 1.72 | F | 87 | F | 89 | F | 91 |
| 2 | | | | | ✓ | | ✓ | A | 1.73 | A | 8 | B | 9 | B | 20 |
| CE 3 | ✓ | | | | | | | A | 1.60 | B | 8 | F | 26 | F | 30 |
| 3 | ✓ | | | | ✓ | | | A | 1.62 | D | 38 | F | 40 | F | 38 |
| CE 4 | | ✓ | | | | | | A | 1.83 | A | 7 | B | 11 | C | 22 |
| 4 | | ✓ | | | | | ✓ | A | 1.80 | A | 9 | B | 12 | C | 23 |
| CE 5 | | | ✓ | | | | | B | 1.38 | F | 92 | F | 93 | F | 93 |
| 5 | | | ✓ | | | | ✓ | A | 1.53 | F | 86 | F | 87 | F | 89 |
| CE 6 | | | | ✓ | | | | A | 1.68 | D | 23 | F | 45 | F | 55 |
| 6 | | | | ✓ | | | ✓ | A | 1.66 | B | 5 | C | 16 | D | 29 |
| CE 7 | | | | | | ✓ | | A | 1.65 | B | 7 | B | 13 | F | 33 |
| 7 | | | | | | ✓ | ✓ | A | 1.67 | B | 6 | B | 12 | C | 23 |

DIRECT THERMAL RECORDING MEDIA WITH DIARYLUREA COMBINATIONS FOR OIL RESISTANCE

CROSS-REFERENCE TO RELATED APPLICATION

This application claims the benefit of U.S. Provisional Application No. 63/396,893, filed Aug. 10, 2022, and titled: DIRECT THERMAL RECORDING MEDIA WITH DIARYLUREA COMBINATIONS FOR OIL RESISTANCE.

FIELD OF THE INVENTION

The present invention relates to direct thermal recording media, with particular application to such media that are substantially phenol-free while incorporating a leuco dye and an acidic developer to provide a heat-activated printing mechanism. The invention also pertains to related methods, systems, and articles.

BACKGROUND OF THE INVENTION

In direct thermal recording, an image is produced by selectively heating the recording material (sometimes called coated thermochromic paper, thermal paper, thermal recording material or media, or thermally responsive record material) at selected locations by passing the material under, or otherwise across, a thermal print head. The recording material includes a coating of a thermally responsive layer, and the image is provided by a heat-induced change in color of the thermally responsive layer. Some common uses of direct thermal recording may include, without limitation, cash register receipts, labels for food or other goods, or event tickets.

Numerous types of direct thermal recording media are known. See, for example, U.S. Pat. No. 3,539,375 (Baum); U.S. Pat. No. 3,674,535 (Blose etal.); U.S. Pat. No. 3,746,675 (Blose et al.); U.S. Pat. No. 4,151,748 (Baum); U.S. Pat. No. 4,181,771 (Hanson et al,); U.S. Pat. No. 4,246,318 (Baum); and U.S. Pat. No. 4,470,057 (Glanz). In these cases, basiccolorless or lightly colored chromogenic material, such as a leuco dye, and an acidiccolor developer material are contained in a coating on a substrate which, when heated to a suitable temperature, melts or softens to permit the materials to react, thereby producing a colored mark or image. Thermally responsive record materials have characteristic thermal responses, desirably producing a colored image of sufficient intensity upon selective thermal exposure.

We have recently made a number of advances in this field relating to the use of certain chemicals or chemical groups in the thermally responsive layer of the recording medium in order to achieve desirable performance characteristics. For example, in US 2022/0184986 (Fisher), we disclose inter alia the use of a combination of developers in the thermally responsive layer to provide a phenol-free recording medium capable of withstanding multiple different types of environmental conditions or agents such as a water soak, contact with polyvinyl chloride meat wrapping film, boiling water, heat, sunlight, and contact with hand sanitizer. The developers in that case include N,N'-diphenyl urea (DPU) combined with urea urethane (UU). In US 2022/0184985 (Fisher), we disclose inter alia the use of certain developers in the thermally responsive layer of a recording medium that has a water-dissolvable or water-dispersible paper substrate, rather than a conventional paper substrate, to provide a phenol-free and water-dispersible recording medium capable of avoiding image fade or image formation problems associated with high heat, high humidity environmental storage conditions. The developers in that case include a derivative of DPU, or DPU in combination with UU.

SUMMARY OF THE INVENTION

We have now made some further discoveries in this general area, this time relating to the problem of image fade when the direct thermal recording medium is exposed to oil. As noted above, direct thermal recording materials are often used as food labels and cash register receipts. In such applications, the recording material can be contacted with oily or greasy fingers, or can be splattered with cooking oil or the like. Contact with such oils often occurs after the recording medium has been imaged to provide a bar code, indicia, or other printed information. Depending on the construction details of the recording material, including the chemical materials used in the thermally responsive layer, such oil can cause the printed image to fade or otherwise become unreadable to a greater or lesser degree.

The challenge of addressing this problem is exacerbated if one stipulates that the recording material must be substantially free of phenol-based chemicals, i.e., phenol-free. This limits the available options for chemicals to be used as the acidic developer in the thermally responsive layer.

We have found that acceptable or improved image retention (a reduction in the amount of image fade after contact with oil) can be achieved when certain combinations of non-phenolic developers are used in the thermally responsive layer. Surprisingly, some of these combinations involve two non-phenolic developers that, when used individually in the thermally responsive layer, provide completely unacceptable image retention after contact with oil. Combinations of special interest are non-phenolic developers that are both diarylurea materials, such as DPU and a derivative of DPU. Of particular note is DPU in combination with an N,N'-diarylurea derivative known in the industry as TGMD (available from Nippon Kayaku Co. Ltd.) having the chemical formula:

We have developed a new family of direct thermal recording materials or media that can address the issue of image fade caused by direct contact with oil, especially oil that is heated above room temperature. The disclosed direct thermal recording media are desirably characterized as being non-phenolic, i.e., having no commercially significant concentration or amount of phenol-based materials.

We therefore disclose herein, among other things, direct thermal recording media that are substantially phenol-free and that include a substrate and a thermally responsive layer carried by the substrate. Dispersed throughout the thermally responsive layer is a leuco dye and a plurality of developers, the developers including N,N'-diphenylurea ("DPU") and a derivative of DPU. The derivative of DPU may be one of:

("NKK-1304")

("TGMD")

("S-176")

In exemplary embodiments, the derivative of DPU is TGMD, and the DPU and TGMD are present in the thermally responsive layer in a relative weight ratio of DPU/TGMD that falls within a range from 30/70 to 60/40, or from 40/60 to 50/50, or that is less than 50/50.

We disclose numerous related methods, systems, and articles.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The inventive articles, systems, and methods are described in further detail with reference to the accompanying drawings, of which.

In the figures, like reference numerals designate like elements.

DETAILED DESCRIPTION OF ILLUSTRATIVE EMBODIMENTS

As noted above, we have discovered unique phenol-free developer chemistries for use in direct thermal recording materials. The new chemistries comprise a combination of two developers which, when used together along with a suitable leuco dye, can produce a multi-purpose direct thermal recording material whose thermal image is much less susceptible to fading or degradation when contacted with an oil such as vegetable oil, compared to when those developers are used individually in otherwise identical thermal recording materials. In fact, in some cases, the recording materials that use only one of the developers produce images that, after being contacted by oil, do not meet even the minimum standard for machine-readability for bar code images. Two such exemplary developers are 1,3-diphenyl urea ("DPU") and TGMD.

Figure 1:
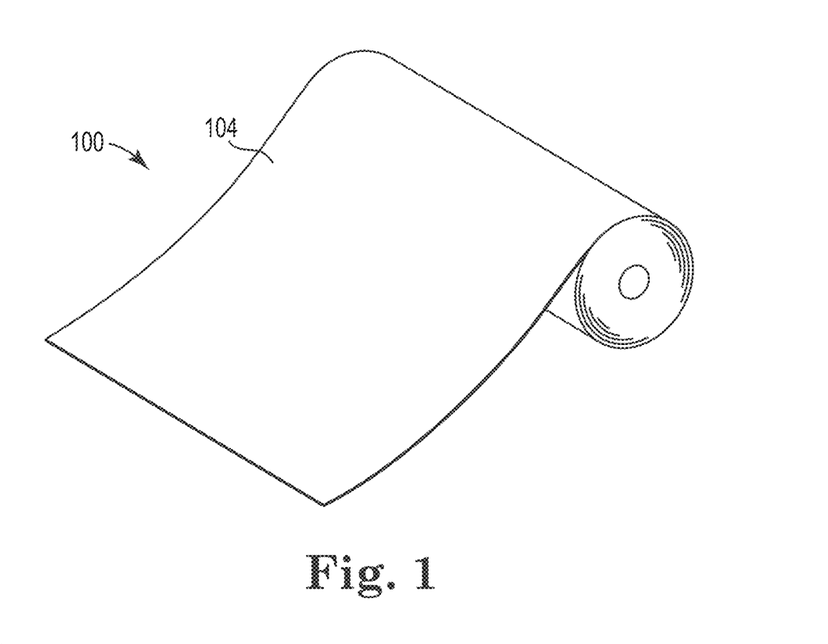
FIG. 1 is a schematic perspective view of a roll of direct thermal recording material or medium.

Direct thermal recording materials are often manufactured in large roll form on industrial-sized coating machines using a continuous web of paper or other flexible substrate material. Such a roll 100 of direct thermal recording material 104 is shown schematically in FIG. 1. After manufacture, the roll 100 can be converted by slitting, cutting, or other standard operations into individual sheets, labels, or smaller rolls. A magnified side or cross-sectional view of the recording material 104 is shown schematically in FIG. 2 to illustrate typical sub-structure made up of component layers or coatings.

Figure 2:
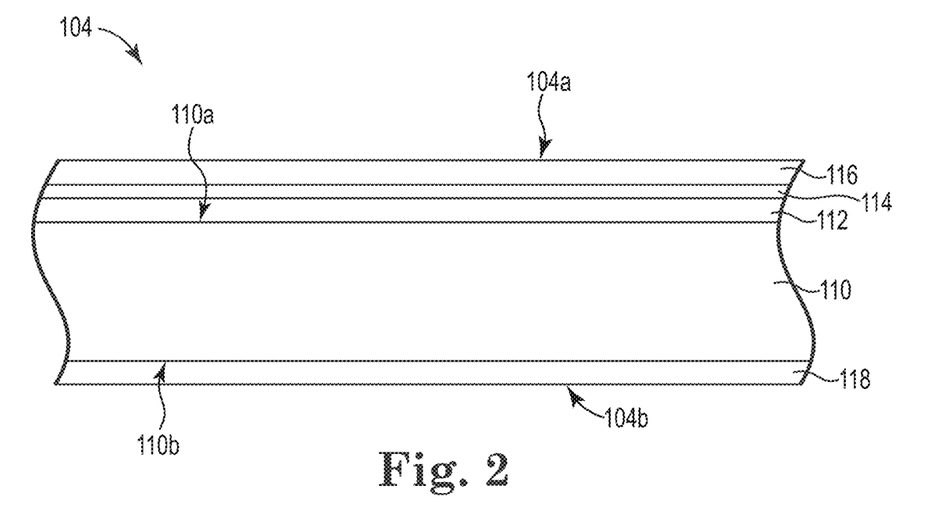
FIG. 2 is a magnified schematic front elevation view, which also serves as a schematic cross-sectional view, of a direct thermal recording material.

The recording material 104 may be made by applying several different coatings to at least one side or major surface 110*a* of a substrate 110. We may refer to the major surface 110*a* as the front surface of the substrate, and the exposed major surface 104*a* may be the front surface of the recording material 104. The opposite major surface 104b may be the back surface of the recording material. Briefly, the substrate 110 is coated to carry a basecoat layer 112, a thermally responsive layer 114, and a topcoat layer 116. The coatings are preferably applied in the order shown, with the layer 114 located between the layers 112, 116, and with the layer 112 located between the layer 114 and the substrate 110. In some cases, the basecoat 112 may be omitted, or the topcoat 116 may be omitted, or both the basecoat and the topcoat may be omitted. The coatings can be formed by any suitable coating technique, including roll coating, knife coating, rod coating, gravure coating, curtain coating, spot coating, and so forth. Furthermore, additional layers and coatings can be added to or included with the recording material on its front and/or back side. For example, one or more coatings can be applied to the opposite side of the substrate, i.e., to the major surface 110b, as discussed further below. But first, the other elements of the direct thermal recording material 104 will now be described in more detail.

The substrate 110 can be any material onto which the other layers can be coated or applied, and then carried. The kind or type of substrate material is not critical. Generally, the substrate 110 is in sheet or roll form, and may be or include a support member such as a web, ribbon, tape, belt, film, card, or the like. In this regard, a sheet denotes an article having two large (major) surface dimensions and a comparatively small thickness dimension, and in some cases, the sheet may be wound up to form a roll. In that regard the substrate 110 is typically thin and flexible, yet strong enough to withstand forces and tensions experienced in a coating machine, without undue breakage. The substrate 110 can be opaque, transparent, or translucent, and can be colored or uncolored. The substrate material can be fibrous including, for example, paper and filamentous synthetic materials. It can be a film including, for example, cellophane and synthetic polymeric sheets cast, extruded, or otherwise formed. Suitable plastic films include films of polypropylene (including oriented polypropylene (OPP) and biaxially oriented polypropylene (BOPP)), polyethylene (PE), and polyethylene terephthalate (PET). The substrate material can thus be non-cellulosic.

An exemplary substrate 110 may be or include a neutral sized base paper, e.g., a conventional paper that is neither water-dissolvable nor water-dispersible. The thickness of the substrate 110 may depend on its composition, but a typical thickness (caliper) range for cellulosic materials is from 1.9 to 12 mils (e.g. 50 to 300 μm), or other suitable thicknesses. The paper may have a basis weight in a range from 35 to 200 g/m², but other suitable basis weights may also be used. The paper may also be treated with one or more agents, such as a surface sizing agent. Uncoated base papers, including unsized, conventionally sized, and lightly treated base papers, can be used. The substrate 110 may be simple in construction and devoid of glossy coatings, or of other substantial, functional coatings. The substrate 110 may, for example, be substantially uniform in composition throughout its thickness, rather than a multilayered construction or material to which one or more separate, functional coatings have already been applied. In some cases, however, it may be desirable to treat, prepare, or otherwise work the substrate 110 in preparation for coating onto it one or more of the other layers shown in the figure.

The basecoat 112 may be applied directly to the surface 110a of the substrate 110 before any other coatings are applied. The basecoat 112 may in some cases be characterized or described as a thermal insulating layer, a separator layer, a heat-reflective layer, an isolation layer, or a prime coat. By tailoring the layer 112 to have a thermal conductivity less than both the thermal conductivity of the thermally responsive layer 114 and the thermal conductivity of the substrate 110, the basecoat 112 provides a degree of thermal insulation between those two other layers. Such thermal insulation promotes image quality, imaging speed, or both, by ensuring that heat delivered by the thermal print head (not shown) at the front surface 104a is not substantially lost by thermal conduction through the thermally responsive layer 114 to the more massive substrate 110.

The basecoat 112 may comprise hollow sphere pigments (HSP), such as product code Ropaque™ TH-2000 or TH-500EF available from The Dow Chemical Company, or other suitable materials. The HSP is useful in lowering the thermal conductivity of the basecoat. The basecoat 112 can be made by a process in which a dispersion is coated onto the surface 110a of the substrate, and then dried. In some cases, the basecoat 112 may be eliminated and omitted from the product construction. When included as part of the recording material, the thermal insulating layer may have a thickness in a range from 2 to 12 μm, or other suitable thicknesses.

The thermally responsive layer 114 may be coated atop the basecoat 112, or atop the substrate 110 if the basecoat is omitted. The layer 114 may alternatively be referred to as a heat-sensitive color-forming layer. This layer 114 comprises a color-forming composition that is thermally sensitive, i.e., it changes color upon sufficient heating. The color-forming composition has two main components: a color-forming dye (electron-donating dye precursor), also known as a leuco dye or chromogenic material, and an acidic developer. The leuco dye and acidic developer are typically ground to individual particle sizes of between 1 to 10 micrometers, dispersed in a binder, and distributed homogeneously and in a contiguous relationship with each other throughout the layer 114. Sufficient heating at any position allows the particles of acidic developer to react with the particles of leuco dye which results in a color change at the site of the heating, usually from light to dark. Known systems and materials are described in U.S. Pat. Nos. 3,539,375 (Baum), 3,674,535 (Blose et al.), 3,746,675 (Blose et al.), 4,151,748 (Baum), 4,181,771 (Hanson et al.), 4,246,318 (Baum), 4,470,057 (Glanz), and 5,955,398 (Fisher et al.).

The acidic developer is preferably non-phenolic, and, as already explained above, advantageously includes a combination of two distinct non-phenolic, diarylurea developer materials, such as 1,3-diphenyl urea ("DPU"), and a material that is a chemical derivative of DPU. DPU may alternatively be referred by names such as: 1-3-Diphenylurea or 1-3-diphenylurea; N,N'-Diphenylurea; Diphenylurea; Urea, N,N'-diphenyl-; CARBANILIDE; Diphenylcarbamide; or $C_{13}H_{12}N_2O$. The chemical formula for DPU is:

Exemplary DPU derivative developers are materials we refer to herein as NKK-1304, TGMD, and S-176, having the following respective chemical formulas:

("NKK-1304")

("TGMD")

("S-176")

NKK-1304 can be expressed as N-[2-(3-phenylureido) phenyl]benzenensulfonamide, and is available from Nippon Soda Co. Ltd. TGMD is available from Nippon Kayaku Co. Ltd. S-176 is available from Sanko Co. Ltd.

One rationale for using developers that are non-phenolic in the thermally responsive layer 114 is to satisfy the market demand for phenol-free receipts, labels, and the like. As such, it is desirable in many cases, but not necessary in all cases, for not only the thermally responsive layer 114 to be phenol-free or substantially phenol-free, but for the entire direct thermal recording material 104 to be phenol-free or substantially phenol-free. We use the term substantially phenol-free to include both items that are absolutely and completely phenol-free, as well as items that may have only trace amounts of phenolic materials below commercially acceptable thresholds.

As we will show in the test results below, when DPU is used by itself with a suitable leuco dye in the thermally responsive layer of a direct thermal recording material, the image initially produced by a direct thermal printer can be fully acceptable, e.g., dark and crisp enough to be easily human-readable, and also easily machine-readable when the image is in the form of a bar code, QR code, or the like. However, if vegetable oil or the like is then applied to the surface of the imaged recording material, the image quality drastically changes from acceptable to completely unacceptable. That is, DPU when used by itself provides substantially no protection against oil contamination, relative to the visibility of the direct thermal image. Our tests also show that several DPU derivative materials, especially TGMD but also NKK-1304, likewise provide virtually no protection against oil contamination. But surprisingly, when the two developer materials are combined (with a suitable leuco dye in the thermally responsive layer of a direct thermal recording material), the resulting product exhibits dramatically better image retention in the presence of oil compared to when each developer is used by itself.

In embodiments that use a combination of developers, such as DPU and TGMD, or DPU and NKK-1304, etc., the developers and the selected leuco dye are each preferably dispersed homogeneously and evenly throughout the thermally responsive layer 114. This does not necessarily mean that these various materials have equal loadings in that layer. In some cases it may be desirable to have roughly equal loadings of the DPU and the other developer, i.e., a relative weight ratio of roughly 1. But other weight ratios can also be used as demonstrated in the examples below. When the DPU is used in combination with TGMD or with a different derivative of DPU, the two developers are preferably the only chemical developers used in the layer 114.

Besides the DPU and second developer, the thermally responsive layer 114 also of course includes at least one leuco dye tailored to react with the plurality of developers at elevated temperatures to produce a mark or color change. The leuco dye, or dyes, may be any known dye(s) capable of such a reaction. Examples include, without limitation:

ODB-2 (CAS no. 89331-94-2, chemical name spiro (isobenzofuran-1(3H),9'-(9H)xanthen)-3-one, 6'-(ethyl (4-methylphenyl)amino)-3'-methyl-2'-(phenylamino)-);

BK305 (CAS no. 129473-78-5, chemical name spiro (isobenzofuran-1(3H),9'-(9H)xanthen-3-one, 6'-(dipentylamino)-3'-methyl-2'-(phenylamino)-); and ETAC (CAS no. 59129-79-2, chemical name spiro (isobenzofuran-1(3H),9'-(9H)xanthen)-3-one, 6'-(ethyl (4-methylphenyl)amino)-3'-methyl-2'-(phenylamino)-).

The thermally responsive layer 114 also includes one or more suitable binders to help hold the particles in the layer together. Such binders may include poly(vinylalcohol), hydroxy ethylcellulose, methylcellulose, isopropyl cellulose, starch, modified starches, gelatin, and the like. Latex materials including polyacrylates, polyvinylacetates, polystyrene, and the like, may also be used. The binder helps maintain the mechanical integrity of the layer 114 in response to brushing or handling forces resulting from use or storage of the recording material 104. Enough of the binder should be present to provide such protection, but not so much so as to interfere with achieving reactive contact between the color-forming reactive materials. The binder may be present at 5 to 30 wt % of the dried coating.

In addition to the leuco dye, the developers, and the binder, the color-forming composition of the layer 114 may also contain one or more materials referred to as modifiers, which aid in color formation. The modifier(s) can function by one or both of (a) lowering the melting point of the dye/developer, and (b) acting as a type of solvent in which the dye and developer dissolve or melt. The modifier(s) may thus facilitate the reaction between the leuco dye and the developer to produce a more intense thermal image, faster imaging, or both. See, for example, U.S. Pat. No. 4,531,140 (Suzuki et al.), U.S. Pat. No. 4,794,102 (Petersen et al.), U.S. Pat. No. 5,098,882 (Teraji et al.), U.S. Pat. No. 6,835,691 (Mathiaparanam et al.), and U.S. Pat. No. 6,921,740 (Hizatate et al.).

Ordinarily, the thermally responsive layer of a conventional direct thermal recording material would be applied in a thickness corresponding to a coat weight from 1.5 to 6 pounds/3,300 ft$^2$ (2.2 to 8.9 g/m$^2$), or more typically from 2-4 pounds/3,300 ft$^2$ (3.0 to 5.9 g/m$^2$), for a finished dry thickness in a range from 1.2 to 4.8 μm, or from 1 to 5 μm. A practical lower limit has been a coat weight of about 1 pound/33,000 ft$^2$ (~1.48 g/m$^2$). The thermally responsive layer 114 of the inventive recording material 104 may also if desired be applied in these same conventional coat weights and thicknesses.

Turning again to FIG. 2, a topcoat layer 116 is shown atop, in contact with, the thermally responsive layer 114. In the embodiment illustrated, the outer major surface of the topcoat 116 is exposed to air and corresponds to the outer major surface 104a of the direct thermal recording material 104. The topcoat 116 is optional and can be omitted if desired. If it is included, it can protect underlying layers of the recording material 104 from unwanted contaminants or substances. For example, some topcoats can be used as barriers or seals against seepage by oils or other unwanted liquids; however, barrier action against oils is limited, particularly at elevated temperatures, and is secondary to barrier action against water.

The topcoat 116 may be any suitable topcoat of conventional design. The topcoat 116 may for example comprise binders such as modified or unmodified polyvinyl alcohols, acrylic binders, crosslinkers, lubricants, and fillers such as aluminum trihydrate and/or silicas. The topcoat 116 may have a thickness in a range from 0.5 to 2 µm, or other suitable thicknesses.

The disclosed recording materials may also include additional layers and coatings other than those discussed above. Such other layers or coatings include coating(s) that can be applied to the back surface 110b of the substrate 110. One such layer is illustrated in FIG. 2, labeled 118. This layer 118 may be an adhesive layer comprising a pressure sensitive adhesive (PSA), hot melt adhesive, or other suitable adhesive. By providing it on the back side of the recording material 104, the recording material can serve as a label and can attach to containers, films, or other bodies while having its front, thermally printed side visible to users. A release liner (not shown) can also be included to cover a PSA layer until ready for use. Release coatings may also be applied to the surface for applications that do not require a liner.

As mentioned above, direct thermal recording materials can potentially be used in a variety of settings. Some of these settings involve the use of oil, including in some cases hot oil, which may splatter onto, or be smeared on or otherwise applied to, an imaged recording material. One objective of our investigation was to identify chemistries, especially non-phenolic chemistries, that can be used to maintain high quality direct thermal images even when contacted or contaminated with such oils.

EXAMPLES and COMPARATIVE EXAMPLES

In accordance with the foregoing teachings, a number of direct thermal recording media samples were fabricated and tested.

Each sample (example or comparative example) was made in the following manner unless otherwise indicated. The first step was to coat a basecoat (see e.g. layer 112 in FIG. 2) onto one side or major surface of a substrate (see e.g. substrate 110 in FIG. 2). The substrate used was a 63 g/m² (gsm) highly refined paper sheet. The paper was neither water-dissolvable nor water-dispersible. The basecoat was thermally insulating and comprised a mixture of calcined clay such as Ansilex 93 by BASF Corporation, and Ropaque™ TH-2000 hollow sphere pigment (HSP) by The Dow Chemical Company, along with an SBR binder, and was applied at a coat weight of 4.5 g/m². After drying, a thermally responsive layer (see e.g. layer 114 in FIG. 2) was coated atop the basecoat. The coat weight of the thermally responsive layer was 1.5 g/m². After this coating was dry, a topcoat (see e.g. topcoat 116 in FIG. 2) was coated onto the surface of the thermally-responsive layer. The topcoat was composed of delaminated clay, PVOH, crosslinker, and lubricant such as zinc stearate, and was applied at a coat weight of 1.5 g/m². After the topcoat was dry, no other coatings were applied to the sample, and the sample was ready for thermal printing and testing.

Details of the coating composition used for the thermally responsive layer will now be described. A number of dispersion formulations were prepared.

One dispersion, referred to as Dispersion A, was made for the chromogenic material (leuco dye). The dispersion had the following formulation, where all parts or percentages are understood to be parts per weight:

TABLE 1

| Dispersion A Formulation | |
|---|---|
| Material | Parts |
| chromogenic material-ODB-2 | 30.0 |
| binder, 20% solution of polyvinyl alcohol in water | 25.0 |
| defoaming and dispersing agents | 0.4 |
| water | 44.6 |

Another dispersion, referred to as Dispersion B1, was made for one of the acidic developer materials, DPU (discussed in detail above), an N,N'-diurea. The dispersion had the following formulation:

TABLE 2

| Dispersion B1 Formulation | |
|---|---|
| Material | Parts |
| developer material-DPU | 38.0 |
| binder, 20% solution of polyvinyl alcohol in water | 18.0 |
| defoaming and dispersing agents | 0.4 |
| water | 43.6 |

Another dispersion, referred to as Dispersion B2, was made for another one of the developer materials, TGMD (discussed in detail above), an N,N'-diurea derivative. The formulation was the same as B1 except that the DPU was replaced with TGMD.

Another dispersion, referred to as Dispersion B3, was made for another one of the developer materials, D-8. D-8 has the chemical formula 4-hydrosyphenyl-4-isopropoxyphenylsulfone, and the following structure:

The formulation was the same as B1 except that the DPU was replaced with D-8.

Another dispersion, referred to as Dispersion B4, was made for another one of the developer materials, TGSH. TGSH has the chemical formula 2,2'-diallyl-4,4' sulfonyl-diphenol, and the following structure:

The formulation was the same as B1 except that the DPU was replaced with TGSH.

Another dispersion, referred to as Dispersion B5, was made for another one of the developer materials, Tolbutamide. Tolbutamide has the chemical formula 1-butyl-3-(4-methyl phenyl) sulfonyl urea, and the following structure:

The formulation was the same as B1 except that the DPU was replaced with Tolbutamide.

Another dispersion, referred to as Dispersion B6, was made for another one of the developer materials, NKK-1304, an N,N'-diurea derivative. NKK-1304 has the chemical formula N-[2-(3-phenylureido)phenyl]benzenensulfonamide, and the following structure:

The formulation was the same as B1 except that the DPU was replaced with NKK-1304.

Another dispersion, referred to as Dispersion B7, was made for another one of the developer materials, S-176, an N,N'-diurea derivative. S-176 is available from Sanko Co. Ltd., and has the following structure:

The formulation was the same as B1 except that the DPU was replaced with S-176.

Different ones of these dispersion formulations were mixed together with other ingredients to create a coating formulation for use in forming the thermally responsive layer of a given sample. The coating formulation was as follows unless otherwise indicated:

TABLE 3

Coating Formulation for Thermally Responsive Layer

| Material | Parts |
| --- | --- |
| Dispersion A1 (chromogenic material/leuco dye) | 22.0 |
| Dispersion B1 or B2 or B3 or (etc.) (developer) | 38.0 |
| binder, 10% solution of polyvinyl alcohol in water | 25.0 |
| Filler slurry, 30% in water | 15.0 |

A first sample, "CE 1" (comparative example 1), was made using the Dispersion B1 as the developer component in the Table 3 coating formulation. This sample therefore contained only one developer—DPU—in the thermally responsive layer.

Another sample, "CE 2" (comparative example 2), was made using the Dispersion B2 as the developer component in the Table 3 coating formulation. This sample therefore contained only one developer—TGMD—in the thermally responsive layer.

Another sample, "Example 2" (or simply "2"), was made using a mixture of equal amounts (by weight) of the Dispersion B1 and the Dispersion B2 as the developer component in the Table 3 coating formulation. The coating formulation thus used 19 parts of Dispersion B1 and 19 parts of Dispersion B2. This sample therefore contained two developers—DPU and TGMD in a 50/50 ratio—in the thermally responsive layer.

Another sample, "CE 3" (comparative example 3), was made using the Dispersion B3 as the developer component in the Table 3 coating formulation. This sample therefore contained only one developer—D-8—in the thermally responsive layer.

Another sample, "Example 3" (or simply "3"), was made using a mixture of equal amounts (by weight) of the Dispersion B1 and the Dispersion B3 as the developer component in the Table 3 coating formulation. The coating formulation thus used 19 parts of Dispersion B1 and 19 parts of Dispersion B3. This sample therefore contained two developers—DPU and D-8 in a 50/50 ratio—in the thermally responsive layer.

Another sample, "CE 4" (comparative example 4), was made using the Dispersion B4 as the developer component in the Table 3 coating formulation. This sample therefore contained only one developer—TGSH—in the thermally responsive layer.

Another sample, "Example 4" (or simply "4"), was made using a mixture of equal amounts (by weight) of the Dispersion B1 and the Dispersion B4 as the developer component in the Table 3 coating formulation. The coating formulation thus used 19 parts of Dispersion B1 and 19 parts of Dispersion B4. This sample therefore contained two developers—DPU and TGSH in a 50/50 ratio—in the thermally responsive layer.

Another sample, "CE 5" (comparative example 5), was made using the Dispersion B5 as the developer component in the Table 3 coating formulation. This sample therefore contained only one developer—Tolbutamide—in the thermally responsive layer.

Another sample, "Example 5" (or simply "5"), was made using a mixture of equal amounts (by weight) of the Dispersion B1 and the Dispersion B5 as the developer component in the Table 3 coating formulation. The coating formulation thus used 19 parts of Dispersion B1 and 19 parts of Dispersion B5. This sample therefore contained two developers—DPU and Tolbutamide in a 50/50 ratio—in the thermally responsive layer.

Another sample, "CE 6" (comparative example 6), was made using the Dispersion B6 as the developer component in the Table 3 coating formulation. This sample therefore contained only one developer—NKK-1304—in the thermally responsive layer.

Another sample, "Example 6" (or simply "6"), was made using a mixture of equal amounts (by weight) of the Dispersion B1 and the Dispersion B6 as the developer component in the Table 3 coating formulation. The coating formulation thus used 19 parts of Dispersion B1 and 19 parts of Dispersion B6. This sample therefore contained two developers—DPU and NKK-1304 in a 50/50 ratio—in the thermally responsive layer.

Another sample, "CE 7" (comparative example 7), was made using the Dispersion B7 as the developer component in the Table 3 coating formulation. This sample therefore contained only one developer—S-176—in the thermally responsive layer.

Another sample, "Example 7" (or simply "7"), was made using a mixture of equal amounts (by weight) of the Dispersion B1 and the Dispersion B7 as the developer component in the Table 3 coating formulation. The coating formulation thus used 19 parts of Dispersion B1 and 19 parts of Dispersion B7. This sample therefore contained two developers—DPU and S-176 in a 50/50 ratio—in the thermally responsive layer.

All of these samples were thin and flexible, and their front surfaces were uniformly white or light in color. Each sample was then tested for its ability to form an image by direct thermal printing, the print quality of that image, and the print quality of the image after contacting the sample with vegetable oil and allowing it to sit for 24 hours.

Direct thermal printing was performed on each sample using a Zebra™ thermal printer, model 140-401, at a speed of 6 inches per second (ips) and using the default energy setting of the print head, which was 11.7 mJ/mm². The printed image was in each case a barcode pattern and a solid rectangular block. The print quality or image quality was tested in two ways. First, the quality (machine readability) of the barcode pattern was measured using a TruCheck™ barcode verifier (model TC-843) operating at a wavelength of 650 nm. The verifier was calibrated to ANSI (American National Standards Institute) Bar Code Print Quality Guideline X3.182, published in 1990. The verifier provides an ANSI value for its measurement of the barcode image. From highest quality (best readability) to lowest quality (worst readability), the measurement ranges from A (3.5 to 4.0), to B (2.5 to 3.4), to C (1.5 to 2.4), to D (0.5 to 1.4), to F (0 to 0.4). A measurement of "A" therefore indicates best readability, and "F" indicates worst readability of the barcode. In many applications, a value of C or better (at least 1.5) is acceptable or passing, and below 1.5 is failing.

The second way the quality of the direct thermal images was tested was by measuring the optical density (darkness) of the solid rectangular block portion of the image. This was done using a Techkon™ SpectroDens Densitometer. The measured Optical Density (OD) value is logarithmic, with an OD of 2.0 being ten times darker than an OD of 1.0.

For each sample, an initial print quality of the printed image was measured using the two techniques described above to provide (1) an ANSI value (A, B, C, etc.) and (2) an OD value. Then, three substantially identical samples were subjected to contact with oil at various temperatures for 24 hours: (1) Crisco™ vegetable oil was brushed onto the front surface of a first sample (after thermal imaging) and allowed to stand at room temperature (RT) for 24 hours, at which time the image quality was measured; (2) the same oil was brushed onto the front surface of a second sample (after thermal imaging) and allowed to stand at 40° C. for 24 hours, at which time it was removed from the oven and the image quality was measured; and (3) the same oil was brushed onto the front surface of a third sample (after thermal imaging) and allowed to stand at 60° C. for 24 hours, at which time it was removed from the oven and the image quality was measured. Exposures at the elevated temperatures were included to provide a more realistic assessment of real-life conditions for these products, since hot oil is known to be present in some user environments.

Figure 6:
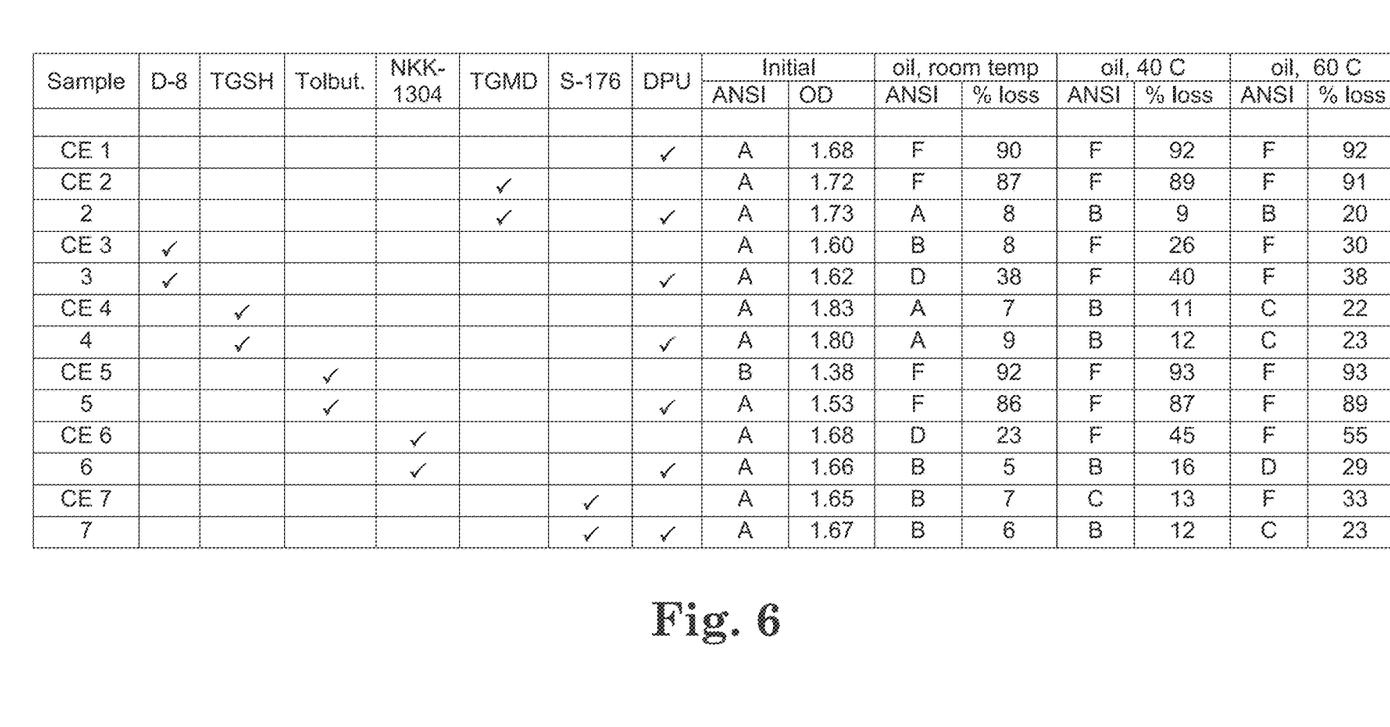
FIG. 6 is a chart showing design details of a large group of direct thermal recording material samples that were made and tested, and test results for direct thermal images that were formed in such samples.

The results of this testing are summarized in the table of FIG. 6. In that table, there is a column labeled "% loss" for each of the oil exposure tests. That number is obtained by comparing the OD measured after the oil test to the initial OD number. In particular, the difference between those OD values is divided by the initial OD number, and the result expressed as a percentage. The remaining columns, letters, and numbers are self-explanatory in view of the above description.

Figure 7:
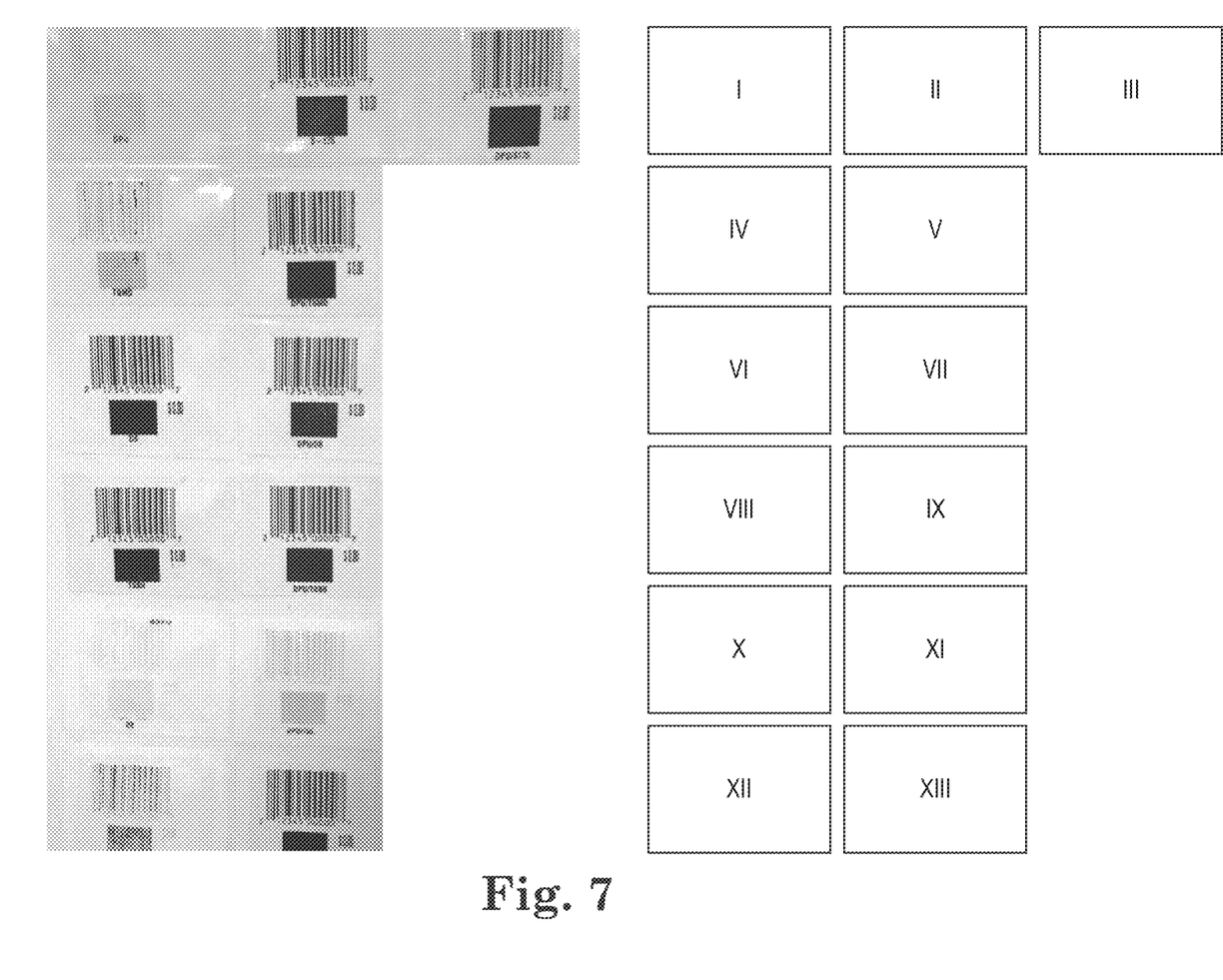
FIG. 7 includes a photograph (grayscale image) of some of the tested samples during one of the heated oil tests, the figure also including a map or key for sample identification purposes.

A wide range of responses were observed. FIG. 7 includes a photograph of an array of 13 samples that were mounted on a stiff backing for placement in an oven for the 40° C. oil test. The samples were removed briefly after a few hours in the oven to allow the picture to be taken, then returned to the oven for the duration of the test. The map or key portion of FIG. 7 can be used to identify each sample in the photograph: (I) corresponds to CE 1; (II) corresponds to CE 7; (III) corresponds to Example 7; (IV) corresponds to CE 2; (V) corresponds to Example 2; (VI) corresponds to CE 3; (VII) corresponds to Example 3; (VIII) corresponds to CE 4; (IX) corresponds to Example 4; (X) corresponds to CE 5; (XI) corresponds to Example 5; (XII) corresponds to CE 6; and (XIII) corresponds to Example 6.

Data from the table of FIG. 6 can be used to create insightful graphs. Three particularly relevant ones are provided in FIGS. 3, 4, and 5.

Figure 3:
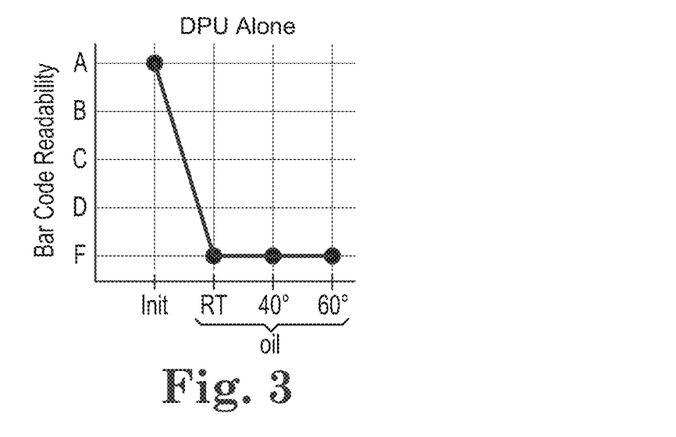
FIG. 3 is a graph of the measured bar code readability under various conditions of a printed image of a direct thermal recording material sample in which N,N'-diphenylurea ("DPU") was the only acidic developer used in the thermally responsive layer.
Figure 4:
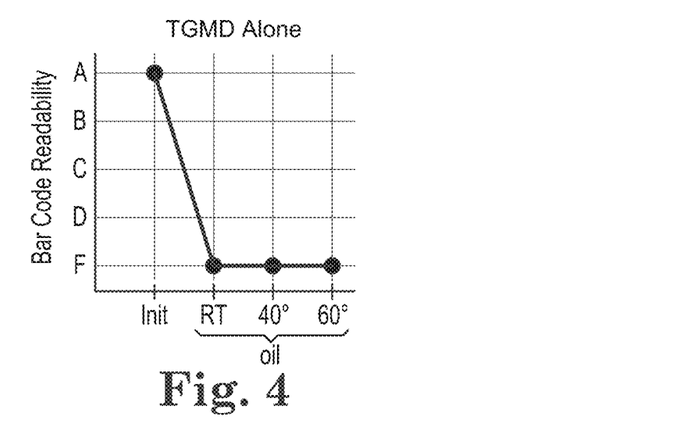
FIG. 4 is a graph similar to that of FIG. 3 but where TGMD was the only acidic developer used in the thermally responsive layer.
Figure 5:
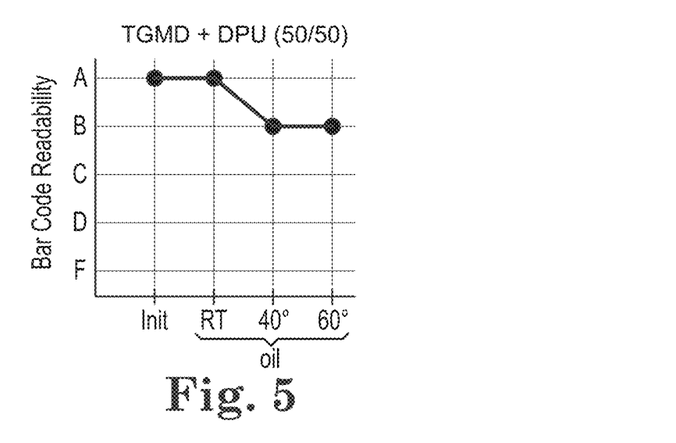
FIG. 5 is a graph similar to that of FIGS. 3 and 4 but where a 50/50 mix of DPU and TGMD was used as the acidic developer in the thermally responsive layer.

In FIG. 3, we see that the barcode readability (as measured by the barcode verifier device) of a sample that uses DPU as the only acidic developer in the thermally responsive layer starts out with excellent readability. However, exposure to oil, even at only room temperature, degrades the image from the highest ANSI score "A" to the lowest score "F". In FIG. 4, we see the same behavior for a sample that uses TGMD (a derivative of DPU) as the only acidic developer. Surprisingly, when these two developers are used in combination (in equal parts, 50/50), the resulting recording medium exhibits dramatically improved image retention when exposed to oil, even the hot oil at 40° C. and 60° C., as shown in FIG. 5.

Figure 8:
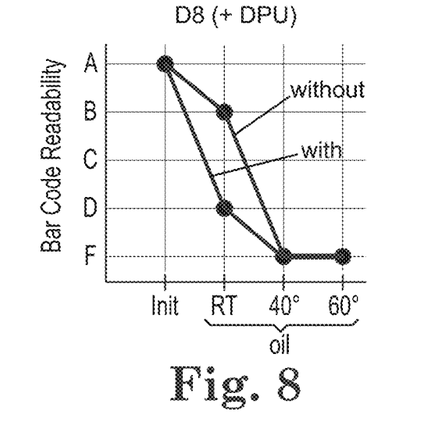
FIG. 8 is a graph of the measured bar code readability under various conditions of the printed image of two direct thermal recording material samples, one in which D8 was the only acidic developer used in the thermally responsive layer, and the other in which a 50/50 mix of D8 and DPU was used as the acidic developer.

FIG. 8 compares a recording medium with D8 as the only developer with a recording medium having the combination (50/50) of D8 and DPU. Here, we see that adding the DPU had no measurable effect on the initial image quality and reduced the image quality for the room temperature oil test.

Figure 9:
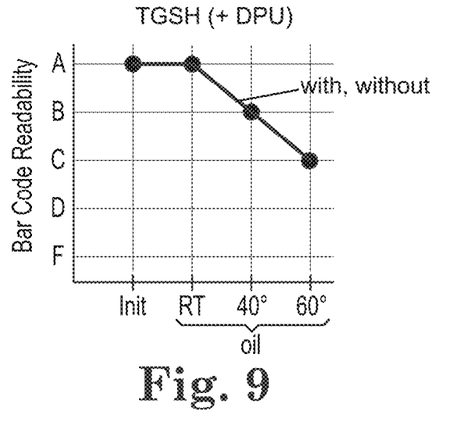
FIG. 9 is a graph similar to that of FIG. 8, but where one sample used TGSH as the only acidic developer, and the other sample used a 50/50 mix of TGSH and DPU as the developer.

FIG. 9 compares a recording medium with TGSH as the only developer with a recording medium having the combination (50/50) of TGSH and DPU. Here, we see that adding the DPU had no measurable effect on any of the ANSI measurements.

Figure 10:
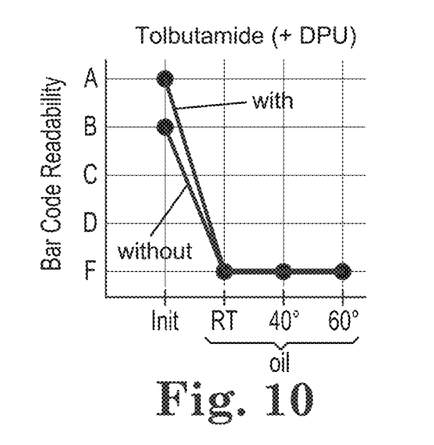
FIG. 10 is a graph similar to that of FIG. 8, but where one sample used Tolbutamide as the only acidic developer, and the other sample used a 50/50 mix of Tolbutamide and DPU as the developer.

FIG. 10 compares a recording medium with Tolbutamide as the only developer with a recording medium having the combination (50/50) of Tolbutamide and DPU. Here, we see that adding the DPU decreased the initial ANSI image quality and had no measurable effect on any of the oil-related measurements.

Figure 11:
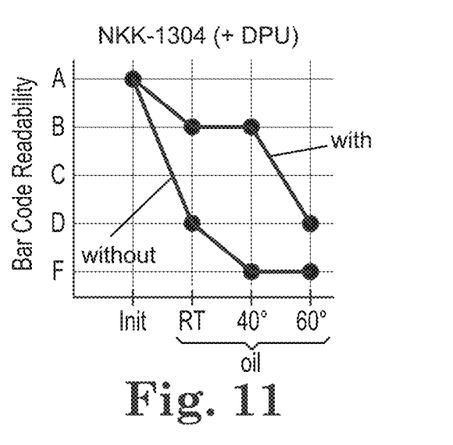
FIG. 11 is a graph similar to that of FIG. 8, but where one sample used NKK-1304 as the only acidic developer, and the other sample used a 50/50 mix of NKK-1304 and DPU as the developer.

FIG. 11 compares a recording medium with NKK-1304 as the only developer with a recording medium having the combination (50/50) of NKK-1304 and DPU. Here, we see that adding the DPU had no measurable effect on the initial ANSI image quality but improved the image quality/retention for all of the oil-related measurements.

Figure 12:
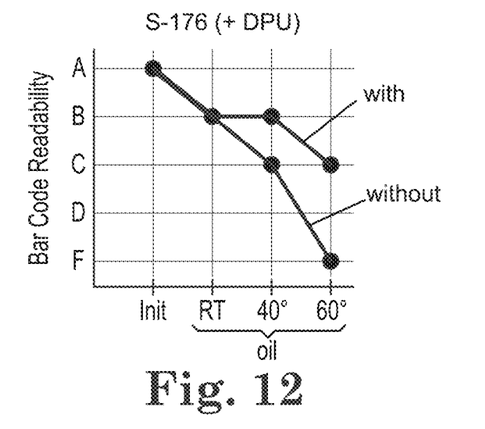
FIG. 12 is a graph similar to that of FIG. 8, but where one sample used S-176 as the only acidic developer, and the other sample used a 50/50 mix of S-176 and DPU as the developer.

FIG. 12 compares a recording medium with S-176 as the only developer with a recording medium having the combination (50/50) of S-176 and DPU. Here, we see that adding the DPU had no measurable effect on the initial ANSI image quality but improved the image quality/retention for some of the oil-related measurements.

We also explored the effect of using weight ratios other than 50/50 for embodiments that use multiple developers. In that regard, we fabricated direct thermal recording media samples similar to Example 2 (50/50 combination of DPU and TGMD) but with different ratios of those materials. For example, a sample we refer to as "Example 2A" or simply "2A" was made using the coating formulation of Table 3 but where the 38 parts of developer dispersion was made up of 30% (about 11.4 parts) of dispersion B1 (containing DPU)

and 70% (about 26.6 parts) of dispersion B2 (containing TGMD). Similarly, Example 2B ("2B") was made using a 40/60 weight ratio of DPU/TGMD, Example 2D ("2D") was made using a 60/40 ratio, and Example 2E ("2E") was made using a 70/30 ratio. Example 2C is simply a relabeling of Example 2, with a 50/50 weight ratio. The sample details and the measurements made on these samples, performed in the same way as described above in connection with FIG. 6, are provided below in Table 4.

TABLE 4

| Sample | DPU (%) | TGMD (%) | Initial ANSI | OD | oil, room temp ANSI | % loss | oil, 40 C. ANSI | % loss | oil, 60 C. ANSI | % loss |
|---|---|---|---|---|---|---|---|---|---|---|
| 2A | 30 | 70 | A | 1.72 | B | 12 | D | 20 | F | 41 |
| 2B | 40 | 60 | A | 1.74 | A | 5 | B | 7 | B | 18 |
| 2C | 50 | 50 | A | 1.73 | A | 8 | B | 9 | B | 20 |
| 2D | 60 | 40 | A | 1.75 | C | 30 | F | 30 | F | 63 |
| 2E | 70 | 30 | A | 1.73 | F | 48 | F | 57 | F | 80 |

Figure 13A:
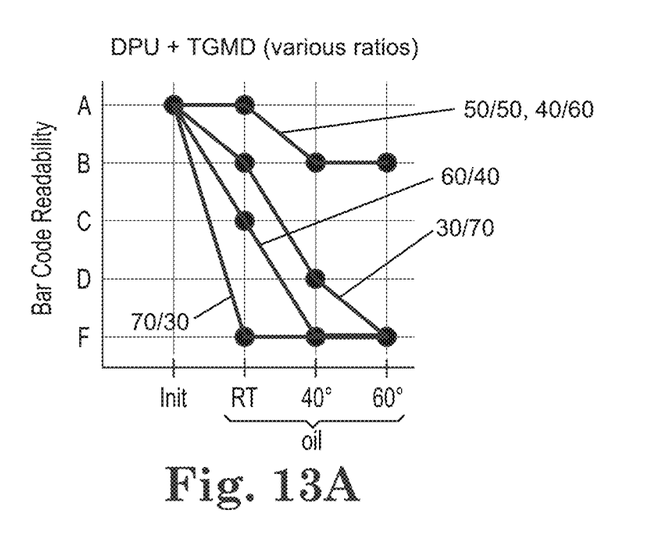
FIG. 13A is a graph similar to that of FIGS. 8-12, but where the testing results for five direct thermal recording material samples are shown, the samples having respective relative weight ratios of DPU/TGMD of sample having a 30/70, 40/60, 50/50, 60/40, and 70/30.
Figure 13B:
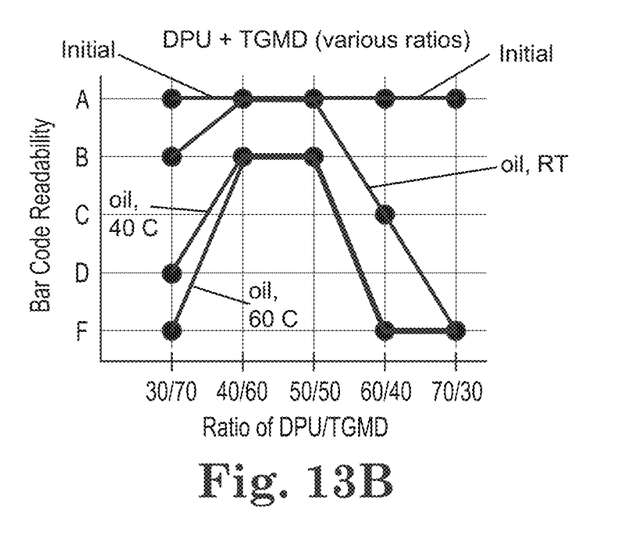
FIG. 13B is a graph that re-plots the data of FIG. 13A by using a horizontal axis representing the weight ratio of DPU/TGMD.

FIGS. 13A and 13B plot some of the data in Table 4. FIG. 13A is laid out in similar fashion to FIGS. 3-5, with the ANSI barcode readability value on the vertical axis and the various measurement conditions (initial reading, oil at room temperature, oil at 40° C., oil at 60° C.) along the horizontal axis. FIG. 13B plots the same data but where the horizontal axis is the weight ratio of DPU/TGMD. Both figures show that the benefits of mixing the two developers generally diminish as one deviates from 50/50. However, FIG. 13B reveals an asymmetrical effect: the 40/60 sample provides the same ANSI image quality results as the 50/50 sample for all conditions, and the 30/70 sample exhibits improvements relative to the 70/30 sample. Thus, to the extent manufacturing variations may occur in concentration from a target ratio, there may be a benefit to using a target ratio that is less than 50/50.

Additional discussion of disclosure in various scopes now follows:

A. A recording medium. The recording medium comprises a substrate and a thermally responsive layer. The thermally responsive layer is carried by the substrate. The thermally responsive layer includes a leuco dye and a plurality of developers. The recording medium is substantially phenol-free. The plurality of developers includes N,N'-diphenylurea ("DPU") and a derivative of DPU.

B. The medium of any of the prior disclosures, further comprising a basecoat between the thermally responsive layer and the substrate.

C. The medium of any of the prior disclosures, further comprising a basecoat containing hollow sphere pigments.

D. The medium of any of the prior disclosures, further comprising a topcoat carried by the substrate such that the thermally responsive layer is disposed between the topcoat and the substrate.

E. The medium of any of the prior disclosures, wherein the DPU and the derivative of DPU are dispersed throughout the thermally responsive layer.

F. The medium of any of the prior disclosures, wherein the thermally responsive layer contains substantially no developers other than the DPU and the derivative of DPU.

G. The medium of any of the prior disclosures, wherein the derivative of DPU is selected from one of ("NKK-1304")

-continued ("TGMD")

("S-176")

H. The medium of any of the prior disclosures, wherein the derivative of DPU is TGMD.

I. The medium of any of the prior disclosures, wherein the derivative of DPU is TGMD, and the DPU and the TGMD are present in the thermally responsive layer in a relative weight ratio of DPU/TGMD that falls within a range from 30/70 to 60/40.

J. The medium of any of the prior disclosures, wherein the derivative of DPU is TGMD, and the DPU and the TGMD are present in the thermally responsive layer in a relative weight ratio of DPU/TGMD that falls within a range from 40/60 to 50/50.

K. The medium of any of the prior disclosures, wherein the derivative of DPU is TGMD, and the DPU and the TGMD are present in the thermally responsive layer in a relative weight ratio of DPU/TGMD that is less than 50/50.

L. The medium of any of the prior disclosures, wherein the recording medium is phenol-free.

M. The medium of any of the prior disclosures, wherein the plurality of developers consists essentially of the DPU and the derivative of DPU.

N. The medium of any of the prior disclosures, wherein the thermally responsive layer has a coat weight from 1.5 to 6 pounds/3,300 ft$^2$.

O. An alternate recording medium. The recording medium comprises a substrate and a thermally responsive layer. The thermally responsive layer is carried by the substrate. The thermally responsive layer includes a leuco dye and a plurality of developers. The plurality of developers consists essentially of N,N'-diphenylurea ("DPU") and a derivative of DPU in a relative weight ratio of DPU/derivative of DPU from 30/70 to 60/40. The recording medium is substantially phenol-free.

P. The medium of any of the prior alternate medium disclosures, wherein the derivative of DPU is selected from one of Q. The medium of any of the prior alternate medium disclosures, wherein the derivative of DPU is TGMD.

R. The medium of any of the prior alternate medium disclosures, wherein the DPU and the derivative of DPU are dispersed throughout the thermally responsive layer.

S. The medium of any of the prior alternate medium disclosures, wherein the DPU derivative is TGMD and the relative weight ratio of DPU/TGMD is from 40/60 to 50/50.

T. The medium of any of the prior alternate medium disclosures, wherein the plurality of developers consists of DPU and TGMD.

Unless otherwise indicated, all numbers expressing quantities, measured properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

The use of relational terms such as "top", "bottom", "upper", "lower", "above", "below", and the like to describe various embodiments are merely used for convenience to facilitate the description of some embodiments herein. Notwithstanding the use of such terms, the present disclosure should not be interpreted as being limited to any particular orientation or relative position, but rather should be understood to encompass embodiments having any orientations and relative positions, in addition to those described above.

Various modifications and alterations of this invention will be apparent to those skilled in the art without departing from the spirit and scope of this invention, which is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

I claim:

1. A recording medium, comprising:
    a substrate;
    a thermally responsive layer carried by the substrate, the thermally responsive layer include a leuco dye and a plurality of developers;
    wherein the recording medium is substantially phenol-free;
    a basecoat between the thermally responsive layer and the substrate, wherein the basecoat comprises hollow sphere pigments; and
    wherein the plurality of developers include N,N'-dipvneylurea ("DPU") and a derivative of DPU having the structure and
    wherein the DPU and the derivative of DPU are present in the thermally responsive layer in a relative weight ratio of DPU/derivative of DPU that falls within a range from 40/60 to 50/50.

2. The medium of claim 1, further comprising:
    a topcoat carried by the substrate such that the thermally responsive layer is disposed between the topcoat and the substrate.

3. The medium of claim 1, wherein the DPU and the derivative of DPU are dispersed throughout the thermally responsive layer.

4. The medium of claim 1, wherein the plurality of developers consists essentially of the DPU and the derivative of DPU.

5. The medium of claim 1, wherein the recording medium is phenol-free.

6. The medium of claim 1, wherein the thermally responsive layer has a coat weight form 1.5 to 6 pounds/3,300 ft$^2$.

7. A recording medium, comprising:
    a substrate;
    a thermally responsive layer carried by the substrate, the thermally responsive layer including a leuco dye and a plurality of developers consisting essentially of N,N'-diphenylurea ("DPU") and a derivative of DPU in a relative weight ratio of DPU/derivative of DPU from 40/60 to 50/50; and
    a basecoat between the thermally responsive layer and the substrate, wherein the basecoat comprises hollow sphere pigments;

wherein the derivative of DPU has the structure and
wherein the recording medium is substantially phenol-free.

8. The medium of claim 7, wherein the DPU and the derivative of DPU are dispersed throughout the thermally responsive layer.

9. The medium of claim 8, wherein the plurality of developer consists of DPU and the derivative of DPU.

* * * * *